UNITED STATES PATENT OFFICE.

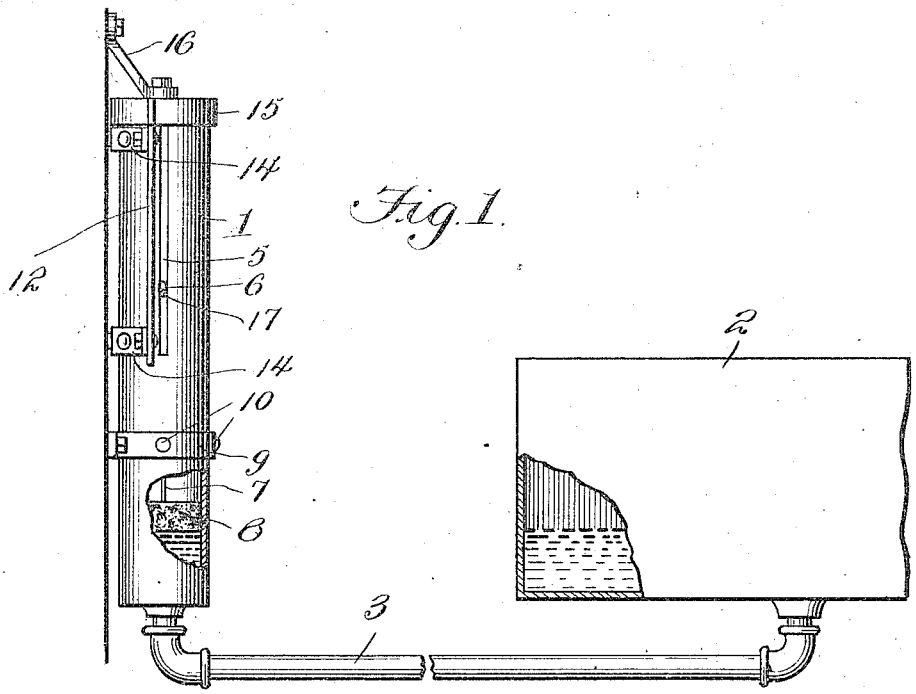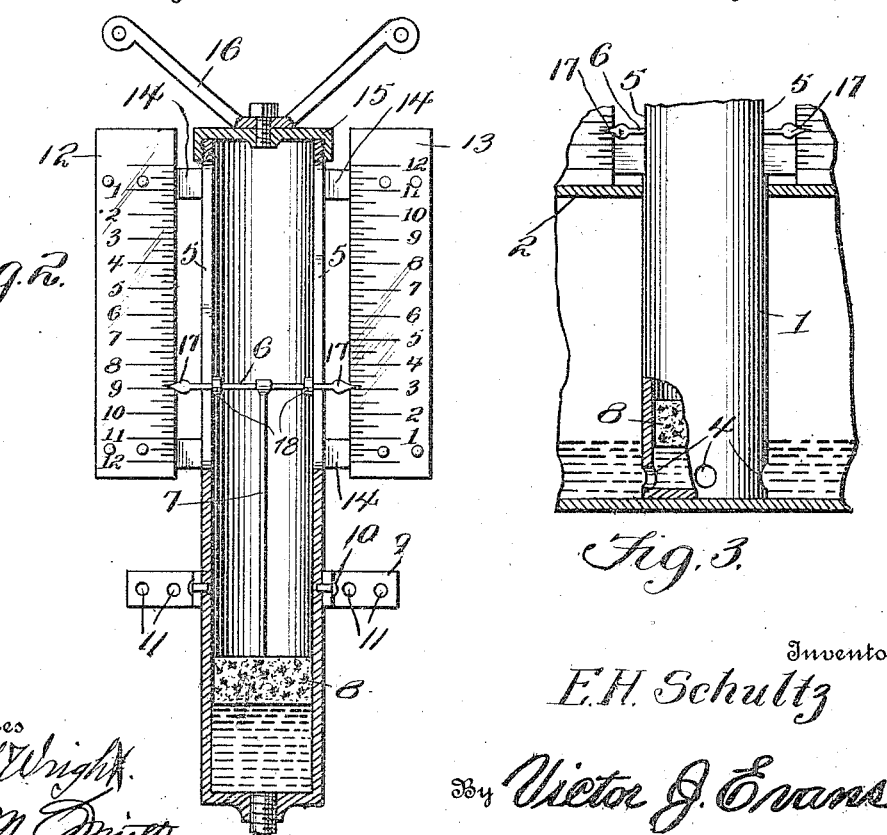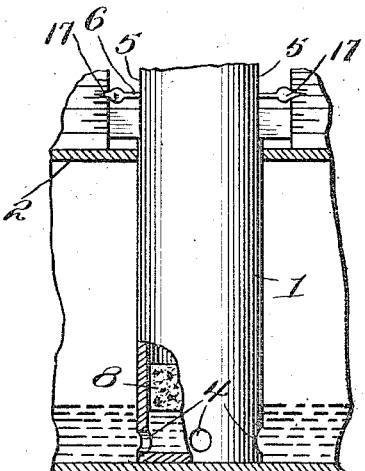

EMIL H. SCHULTZ, OF EVERETT, WASHINGTON, ASSIGNOR OF ONE-HALF TO WILLIAM C. COURTNEY, OF EVERETT, WASHINGTON.

LIQUID-LEVEL INDICATOR.

1,192,693.

Specification of Letters Patent. Patented July 25, 1916.

Application filed October 17, 1914. Serial No. 867,238.

*To all whom it may concern:*

Be it known that I, EMIL H. SCHULTZ, a citizen of the United States, residing at Everett, in the county of Snohomish and State of Washington, have invented new and useful Improvements in Liquid-Level Indicators, of which the following is a specification.

This invention relates to liquid level indicators and is especially designed for use on motor cars to indicate the level of gasolene in the gasolene supply tank, enabling the operator to observe at any and all times the amount of gasolene remaining in the tank.

While especially designed for use in the connection referred to, it will, of course, be understood that the indicator may be used in a variety of ways and for a variety of purposes such as indicating the level of liquid in barrels or receptacles of any kind, large or small.

With the above and other objects in view, the invention consists in the novel construction, combination and arrangement of parts, as herein described, illustrated and claimed.

In the accompanying drawings: Figure 1 is a view partly in side elevation and partly in section showing the apparatus of this invention as applied to the gasolene tank of a motor car. Fig. 2 is an enlarged vertical section through the standpipe and parts immediately adjacent thereto. Fig. 3 is a view partly in elevation and partly in section showing the indicator associated directly with a tank.

In carrying out the present invention, I employ a standpipe 1 which is approximately twice the height of the tank 2 containing the liquid the level of which is to be indicated. In case the tank 3 is located under the seat of an automobile so that the standpipe cannot be placed therein, a pipe 3 is used to connect the bottom of the tank with the bottom of the standpipe so that the same level will be maintained at all times in both the standpipe and tank. Where, however, it is possible to place the lower end of the standpipe directly in the tank, the pipe 3 may be dispensed with and a plurality of entrance holes 4 formed in the bottom of the stand pipe 1 to allow the liquid to enter said standpipe as shown in Fig. 3.

The upper portion and approximately the upper half of the standpipe 1 is provided at diametrically opposite points with slots 5 extending longitudinally thereof for the purpose of receiving a cross bar 6 the end portions of which are movable up and down in the slots 5. The cross bar 6 is connected fixedly to and carried by a vertical stem 7 on the lower end of which is fastened a float 8 contained in the standpipe 1 and adapted to rise and fall with the liquid level. The standpipe 1 is adapted to be fastened to a supporting wall such as the dash of an automobile by means of straps or brackets 9 which may be riveted or otherwise fastened to the standpipe as shown at 10, the end portions of the straps or brackets 9 being formed with holes 11 to receive screws or bolts whereby said standpipe is securely fastened in a fixed position.

Arranged at opposite sides of the standpipe are graduated scale plates 12 and 13, said plates being graduated reversely or in other words, the scale plate 12 having the graduations running from top to bottom thereof and the scale plate 13 having the graduations running from the bottom to the top thereof. These graduations are shown as numbered in gallons, the reverse arrangement enabling the operator at a glance to tell how many gallons have been consumed and how many gallons remain in the tank. The scale plates are connected to and supported by the stand pipe 1 by means of straps 14 preferably arranged between the top and bottom of the scale plates as shown and fastened to said parts by rivets or their equivalent. The top of the stand-pipe is preferably closed by a threaded and removable cap 15 to give access to the parts contained in the standpipe. The cap 15 also forms a convenient attachment for an additional bracket 16 for fastening the standpipe to a supporting wall. At its opposite extremities the cross bar 6 is provided with the indicating pointers 17 which move along the graduated scale plates 12 and 13 so as to register with the graduations thereof. Collars 18 on the cross bar 6 form guiding shoulders which bear against the inner surface of the standpipe thus insuring a rectilinear movement of the float stem 7.

From the foregoing description taken in connection with the accompanying drawings, it will now be understood that as the level of liquid in the tank 2 falls, the float 8 descends gradually, a corresponding movement being therefore imparted to the cross bar 6 causing the pointers 7 to move along the scale plates 12 and 13. Therefore, the operator at a glance may tell how many gallons of liquid have been consumed and how many gallons remain in the tank 2. The arrangement shown and described produces a simple and inexpensive construction and an indicating device which is thoroughly reliable and accurate in operation.

What I claim is:—

In a liquid level indicator, a standpipe the height of which is approximately twice as great as the liquid storage tank in connection with which the indicator is used, said pipe being formed at diametrically opposite points with slots extending longitudinally of the upper half thereof and also having a liquid entrance opening at the bottom thereof, graduated scale plates located at opposite sides of said standpipe and supported thereby, a float in said pipe, a stem extending upwardly from said float, a cross bar on the upper extremity of said stem extending through said slots and having indicating pointers at the opposite ends thereof projecting from opposite sides of the standpipe and movable along said scale plates, and guiding shoulders on said cross bar contacting with the inside wall of said standpipe at diametrically opposite points.

In testimony whereof I affix my signature in presence of two witnesses.

EMIL H. SCHULTZ.

Witnesses:
 WILLIAM C. COURTNEY,
 G. W. HIRSRKORN.